United States Patent Office 3,153,286
Patented Oct. 20, 1964

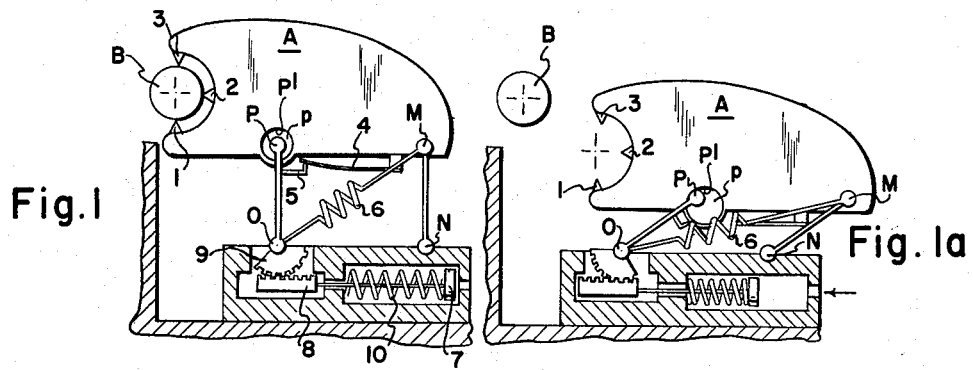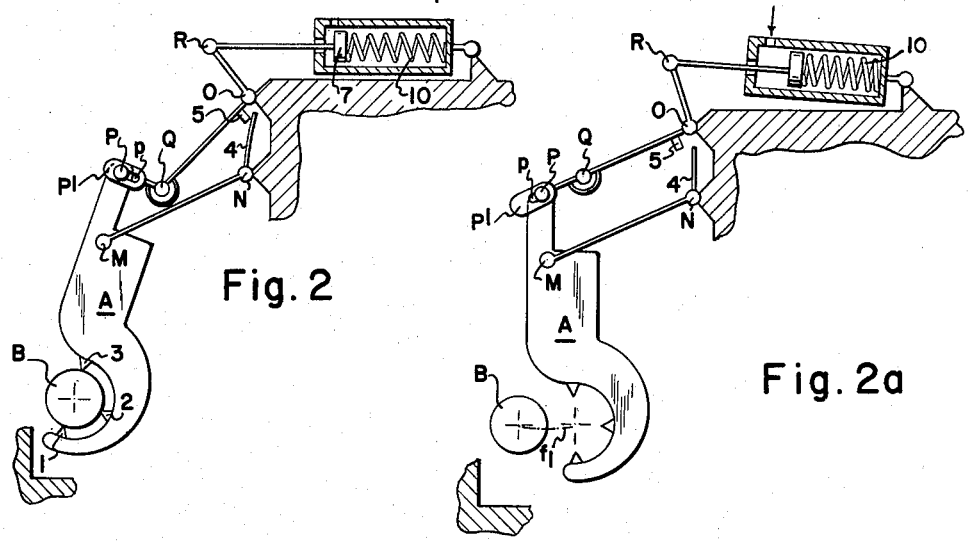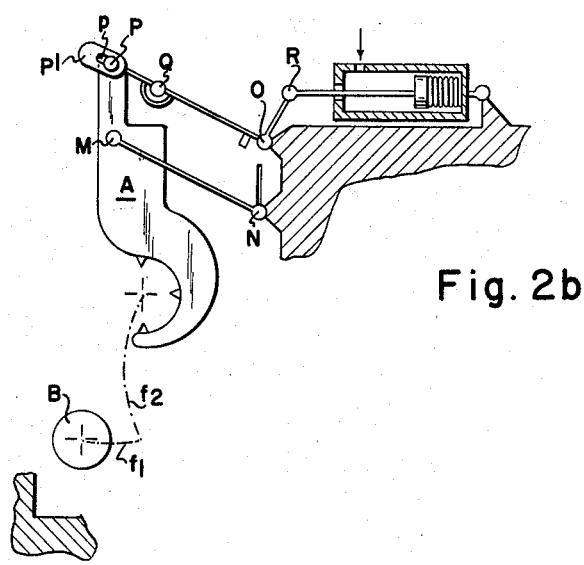

3,153,286
AUTOMATIC DEVICES FOR BRINGING A MEASURING GAUGE INTO THE POSITION OF MEASUREMENT AND WITHDRAWING SAID GAUGE FROM THAT POSITION
Pierre Buisson, 16 Ave. Victor Hugo, Vanves, France
Filed Feb. 1, 1960, Ser. No. 6,042
11 Claims. (Cl. 33—168)

The present invention relates to transfer systems and devices for moving measuring gauges into the position of measurement and withdrawing said gauges from that position to a position of rest.

An automatic device for bringing a measuring gauge into the measurement position and then withdrawing said gauge from that position must comply with two essential conditions:

(1) It must locate the gauge in a well-defined position with respect to the workpiece during the actual period of measurement;

(2) It must locate the gauge in a series of positions which are also well-defined, but in this case with respect to the frame of the machine during the retraction movement to a position of rest in which the workpiece is completely disengaged, in order to enable changing of workpieces to be readily effected.

Generally speaking, a device of this kind is made of two separate parts:

(1) A gauge-transfer device, such as a sliding carriage or a deformable parallelogram;

(2) An articulated system or a device deformable by bending which couples the gauge to the gauge-transfer device and enables it to follow more or less completely the movements of the workpiece in the position of measurement.

In accordance with the invention, the gauge-transfer device comprises a system of articulated arms, of which one is formed by a portion of the body of the gauge, a lost-motion device being interposed in the articulation which couples two of said arms, the system being constituted by a deformable polygon having a closed circuit during the transfer operations and having an open circuit in the position of measurement, the coupling between the said two arms being rendered inoperative by said lost-motion device during the operation of measurement.

According to the invention, therefore, a single circuit is formed by the association of the articulated arms, one of these arms being constituted by the gauge itself, this circuit being closed during the operations of transfer of the gauge, its retraction from or bringing into the measuring position, and then opened during the measurement period when the gauge is placed in position on the workpiece.

By the terms "open circuit" and "closed circuit" applied to the gauge-transfer systems in the present specification are meant that the system is complete and in positive engagement during the transfer movements, while in the position of measurement the system is disarticulated at one point in respect of movements of small amplitude.

Different arrangements may be adopted, depending on the path imposed on the gauge, from its position of measurement on the workpiece to its initial position or position of rest. All these arrangements have a common feature which has just been indicated above: namely that the circuit is open during measurement and closed during transfer, supplemented by a common characteristic which definitely ensures that the gauge positions itself accurately on the workpiece in the position of measurement, this common characteristic being that the gauge has always three feelers or contact points.

A further feature of the invention resides in the fact that the transfer device has the form of a polygon acting as a closed circuit during the transfer. This polygon should be deformable in order to ensure the said transfer, and it will therefore have at least four sides. More complicated movements will be obtained by increasing the number of articulations, but in all cases the actuating movement or transfer-driving motion will always be a simple linear or circular motion which is also continuous.

In accordance with a further feature of the invention, the transfer device has the form of an articulated polygon with four sides, one of which is constituted by the gauge itself. In the measuring position, the polygon forms an open circuit, the position of measurement being defined by the absence of any contact between the walls of the bore provided in the gauge and the associated head of the driving arm of the polygon.

The position in contact between the workpiece to be gauged and the fixed feelers of the gauge is ensured by means of springs.

A mechanical or electro-mechanical device acts on one of the arms of the polygon to withdraw the gauge from the workpiece and return it to the position of rest, the arrangement being such that the transfer device has no influence whatever on the actual measurement.

In a further embodiment of the invention, the polygon is provided with an additional arm in order to give a more complex movement of withdrawal of the gauge from the workpiece.

The invention will be explained in more detail in the description which follows below with reference to the accompanying drawings, the description and drawings being given by way of example only and not in any sense by way of limitation. In these drawings:

FIG. 1 is a diagrammatic view in side elevation showing a gauge-transfer device in the form of a quadrilateral, in the position of measurement;

FIG. 1b is a similar view to that of FIG. 1, showing the gauge in the fully retracted position or position of rest;

FIG. 2 is a diagrammatic view in side elevation, showing a gauge-transfer device in the form of a polygon with five sides, the gauge being shown in the position of measurement;

FIG. 2a is a view similar to that of FIG. 2, showing the gauge in an intermediate position, just disengaged from the workpiece;

FIG. 2b is a further view of the arrangement of FIG. 2, showing the gauge fully retracted in the position of rest.

Referring now to FIG. 1, the gauge A is in the position of measurement on the cylindrical workpiece B, the gauge being in contact with the workpiece at three points represented by the fixed feelers 1 and 2 and the feeler 3 associated with the measuring device.

The polygon MNOP with four sides or arms, of which one side PM is formed by the gauge itself, constitutes an open circuit, the articulation at the pivotal shaft or pivot P having a large degree of play at $p$, the position of measurement being defined by the absence of any contact between the pivotal shaft P of the head of the driving arm OP and cylindrical walls of the bore $P^1$ formed in the gauge.

A spring blade 4 pushed by the finger 5 fixed on the arm OP, and a tension spring 6 ensure the position in contact of the fixed feelers 1 and 2 on the workpiece, while the spring 6 also assists the driving effort.

The driving device is composed of a piston 7 rigidly fixed to a toothed rack 8 engaging a toothed segment 9 fixed to the arm OP and pivoted with said arm about the axis O. A compression spring 10, acting on the inner face of the piston 7, maintains the arm OP in the position of measurement shown in FIG. 1 in the absence of any driving force applied to the outer face of the piston.

It will be observed that, in the position of measurement of FIG. 1, the gauge is only coupled at M to the arm MN which couples it to the base through the articulation N. The gauge has therefore a certain freedom of movement in the plane of the drawing corresponding to the play at $p$, and is only urged towards the retracted position when the pivot P has made contact with the wall of the bore $P^1$ in the gauge. The operation of measurement is thus carried out under the best conditions. The movements of the axis of the workpiece and its variations in diameter are totally without effect on the accuracy of measurement, provided always that the amplitudes of such movements and variations, in the position of measurement, do not equal or exceed the play at $p$.

The movement of retraction is effected by applying hydraulic or pneumatic pressure on the side of the piston opposite to the spring 10. It is clear however that any other mechanical or electro-mechanical device may be employed as the driving power for this movement, since the accuracy of the transfer device has no influence on the accuracy of the actual measurement.

The arm OP pivots about the axis O, the finger 5 being disengaged from the spring blade 4 at the same time as the play at $p$ is absorbed. The circuit of the quadrilateral MNOP is closed, this quadrilateral in the present case having the form of a parallelogram which is deformed until it reaches the position of rest shown in FIG. 1a.

The gauge will again be brought into the position of measurement by a cycle which is the reverse of that above, as soon as the action of the fluid on the piston is stopped.

The disengaging movement of the gauge from the workpiece must sometimes be more complicated, in which case an additional arm is then employed. FIG. 2 shows a support in which the gauge A is in the position of measurement on the cylindrical workpiece B, with which it is in contact at three points represented by the fixed feelers 1 and 2 and the feeler contact 3 associated with the measuring device.

The polygon MNOP and MNOQP now has five sides or arms, of which one PM is formed by an extension limb of the gauge itself and forms an open circuit, the articulation $P_p$ being formed by a pivot pin P sliding in a slot $p$ formed in the arm of $QP^1$. The position of measurement is defined, as in the previous case, by the absence of any contact of the pin with the extremities of the slot, while in addition the arm $QP^1$ can oscillate about Q giving the gauge complete freedom to take up its position on the workpiece.

The pivot Q is of the 180° abutment type as shown diagrammatically in FIG. 2, and permits a pivotal movement of the arm $QP^1$ until the arm $QP^1$ and QO come into alignment, when the pivot comes into abutment.

A spring blade 4, urged by the finger 5, tends to cause the arm MN to pivot, compensates the weight of the gauge, and ensures the application of the feelers 1 and 2 on the workpiece. The second spring 6 used in the embodiment shown in FIG. 1 is not required in this case, since the gauge tends to be applied on the workpiece by gravity.

The actuating device is the same as that of FIG. 1. It comprises a piston 7 returned by a spring 10, but in this case the piston acts directly on an arm OR rigidly fixed to the arm OQ. This alternative construction is a clear illustration that the methods of actuation may be very different but they are always simple.

It will be observed that the gauge, which is coupled only at M to the arm MN which couples it to the supporting base through the articulation N, is free to move in the plane of the drawing, and that the gauge is provided with three contact feelers as in the previous case.

The lifting operation is carried out in two stages, plus a preparatory stage during which the pressure of the spring 4 which applies the fixed contact feelers 1 and 2 of the gauge to the workpiece, is eliminated, so as to avoid excessive resistance at the beginning of the lifting period.

To this end, the arm OQ which is drawn upwards by the driving device first releases the pressure on the spring 4 associated with the arm MN, and the gauge tends to fall downwards. As the arm OQ continues its upward movement, the arm and slot $QP^1$ take up the play at $p$ in the slot $p$ and then the arm pushes the pivot P on the gauge towards the left, the gauge pivoting about the articulation M. This frees the gauge and brings it into the position shown in FIG. 2a.

As soon as the play in the slot has been taken up, the polygon MNOP and MNOQP represents a closed circuit, and is a pentagon which is deformable in all directions, in the plane of the drawing, but as soon as the pivot Q comes into the abutment position when the arms OQ and QP are in line, the pentagon becomes a parallelogram MNOP as in the case of the embodiment shown in FIG. 1.

The complete evolution of the movement of retraction leads to the position shown in FIG. 2b, in perfect analogy with FIG. 1b above. It will be noted from FIG. 2b that the movement of the gauge in engaging and disengaging from the workpiece follows successively two intersecting arcs of circles, as shown by the arrows $f_1$, $f_2$.

The contact feeler 2, which defines the position of the gauge in a position perpendicular to the axis, defining the diameter measured can be placed so as to be supported by the workpiece; alternatively the said feeler can be constituted by an abutment fixed on the frame and having the same effect as in the previous case.

In all the figures referred to, the polygon formed by the arms during the actual transfer operation is a parallelogram. This condition is however not absolutely essential, since the use of arms of unequal length will enable different trajectories of movement to be followed, without departing from the spirit or from the scope of the present invention.

What I claim is:

1. A transfer device for bringing a measuring gauge into the position of measurement and withdrawing said gauge from said position after measurement, said device comprising: a system of articulated arms; a portion of the body of said gauge forming one of said arms; a lost-motion device interposed in the articulation which couples two of said arms; said system constituting a deformable polygon having a closed circuit during the transfer operations and having an open circuit in the position of measurement, the coupling between said two arms being rendered inoperative by said lost-motion device during the measuring operation.

2. A transfer device for bringing a measuring gauge into the position of measurement and withdrawing said gauge from said position after measurement, said device comprising: a system of four articulated arms; a portion of the body of said gauge forming one of said arms; a lost-motion device interposed in the articulation which couples two of said arms; said system constituting a deformable parallelogram causing said gauge to be displaced along an arc of a circle, and having a closed circuit during the transfer operation and an open circuit in the position of measurement, the coupling between said two arms being rendered inoperative due to said lost-motion device during the measuring operation.

3. A gauge-transfer device as claimed in claim 2, in which said lost-motion device is constituted by a substantial clearance between a free extremity of one of said articulated arms and the walls of a bore in the body of said gauge co-operating with said free extremity of said arm.

4. A gauge-transfer device as claimed in claim 2, and further comprising tension-spring means acting along one diagonal of said parallelogram for urging said gauge into the position of measurement; and a contact finger fixed on one arm and co-operating with a spring blade fixed on an adjacent arm, so as to act in opposition to said tension spring in the position of measurement.

5. A gauge-transfer device as claimed in claim 3, and further comprising power-actuated means acting on said free extremity of said articulated arm, in order to withdraw said gauge into its position of rest.

6. A gauge-transfer device as claimed in claim 5, in which said power-actuated means comprises a toothed quadrant fast for pivotal movement with said articulated arm; a toothed rack engaging said quadrant; a fluid-operated jack for actuating said rack; and a restoring spring acting on said jack in opposition to said fluid.

7. A transfer device for bringing a measuring gauge into the position of measurement and withdrawing said gauge from said position after measurement, said device comprising: a system of five articulated arms; a portion of the body of said gauge forming one of said arms; a lost-motion device interposed in the articulation which couples two of said arms; said system constituting a deformable pentagon causing said gauge to be displaced successively along two intersecting arcs of circles, and having a closed circuit during the transfer operation and an open circuit in the position of measurement, the coupling between said two arms being rendered inoperative by said lost-motion device during the measuring operation.

8. A gauge-transfer device as claimed in claim 7, in which said lost-motion device comprises a pin fast with one extremity of said gauge body, and an elongated slot formed in the extremity of one of said arms, said pin moving in and co-operating with said slot.

9. A gauge-transfer device as claimed in claim 7, in which said gauge is urged into the position of measurement by gravity, and further comprising a contact finger and co-operating spring blade acting in opposition to the weight of said gauge in the position of measurement.

10. A gauge-transfer device as claimed in claim 8, in which said slotted arm is coupled to the next adjacent operating arm of said pentagon by a freely-displaceable articulation, and further comprising power-actuated means acting on said operating arm to raise said gauge from the measuring position into the position of rest.

11. A gauge-transfer device as claimed in claim 10, in which said power-actuating means comprises a further arm fast for pivotal movement with said operating arm; a fluid-operated jack acting on said further arm in the direction of retraction of said gauge; and a return spring acting on said jack in opposition to the fluid pressure in said jack.

References Cited in the file of this patent

UNITED STATES PATENTS

| | | |
|---|---|---|
| 2,249,904 | Lewis | July 22, 1941 |
| 2,394,475 | Pierce | Feb. 5, 1946 |
| 2,516,053 | Farkas | July 18, 1950 |
| 2,739,484 | Orr | Mar. 27, 1956 |
| 2,912,870 | Green | Nov. 17, 1959 |